United States Patent
Park et al.

(10) Patent No.: US 11,540,322 B2
(45) Date of Patent: Dec. 27, 2022

(54) METHOD FOR PERFORMING RANDOM ACCESS PROCEDURE BETWEEN TERMINAL AND BASE STATION IN WIRELESS COMMUNICATION SYSTEM, AND DEVICE SUPPORTING SAME

(71) Applicant: LG Electronics Inc., Seoul (KR)

(72) Inventors: Changhwan Park, Seoul (KR); Kijun Kim, Seoul (KR); Seonwook Kim, Seoul (KR); Eunsun Kim, Seoul (KR); Joonkui Ahn, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/494,005

(22) PCT Filed: Mar. 13, 2018

(86) PCT No.: PCT/KR2018/002924
§ 371 (c)(1),
(2) Date: Sep. 13, 2019

(87) PCT Pub. No.: WO2018/169278
PCT Pub. Date: Sep. 20, 2018

(65) Prior Publication Data
US 2021/0127425 A1      Apr. 29, 2021

Related U.S. Application Data

(60) Provisional application No. 62/470,889, filed on Mar. 14, 2017.

(51) Int. Cl.
*H04W 74/08* (2009.01)
*H04W 16/28* (2009.01)

(52) U.S. Cl.
CPC ....... *H04W 74/0833* (2013.01); *H04W 16/28* (2013.01)

(58) Field of Classification Search
CPC .................... H04W 74/0833; H04W 16/28
See application file for complete search history.

(56) References Cited

U.S. PATENT DOCUMENTS 10,477,591 B2 * 11/2019 Jung .................. H04W 74/006
2010/0220713 A1 * 9/2010 Tynderfeldt ...... H04W 56/0045
370/350

(Continued)

FOREIGN PATENT DOCUMENTS

KR     1020130011993      1/2013
KR     1020150003827      1/2015

(Continued)

OTHER PUBLICATIONS

International Search Report and Written Opinion in PCT Application No. PCT/KR2018/002924, dated Jul. 6, 2018, 21 pages (with English translation).

(Continued)

*Primary Examiner* — Gary Mui
*Assistant Examiner* — Chuong M Nguyen
(74) *Attorney, Agent, or Firm* — Fish & Richardson P.C.

(57) ABSTRACT

Disclosed are a method for performing a random access procedure between a terminal and a base station in a wireless communication system and a device supporting the same. More particularly, the present invention provides a description of a method for performing a random access procedure between a terminal and a base station in a wireless communication system capable of transmission or reception of a signal through a plurality of beams. The terminal is capable (Continued)

of communicating with at least one of another terminal, a terminal related to an autonomous driving vehicle, the base station or a network.

15 Claims, 15 Drawing Sheets

(56) References Cited

U.S. PATENT DOCUMENTS

| | | | | |
|---|---|---|---|---|
| 2016/0205661 A1* | 7/2016 | Ryu | | H04W 68/02 |
| | | | | 455/458 |
| 2016/0255591 A1* | 9/2016 | Park | | H04W 4/70 |
| | | | | 455/522 |
| 2017/0223744 A1* | 8/2017 | Qian | | H04W 74/0833 |
| 2017/0231011 A1* | 8/2017 | Park | | H04W 72/0446 |
| 2017/0251460 A1* | 8/2017 | Agiwal | | H04W 72/0406 |
| 2017/0303224 A1* | 10/2017 | Choi | | H04L 27/2613 |
| 2017/0331670 A1* | 11/2017 | Parkvall | | H04W 52/0245 |
| 2018/0212659 A1* | 7/2018 | Xiong | | H04B 7/0695 |
| 2018/0235013 A1* | 8/2018 | Jung | | H04W 74/006 |
| 2018/0359790 A1* | 12/2018 | Ingale | | H04W 8/22 |
| 2019/0104549 A1* | 4/2019 | Deng | | H04L 27/2607 |
| 2019/0320430 A1* | 10/2019 | Kim | | H04L 27/2607 |
| 2020/0296765 A1* | 9/2020 | Kim | | H04W 56/001 |

FOREIGN PATENT DOCUMENTS

| | | |
|---|---|---|
| KR | 1020160063061 | 6/2016 |
| KR | 1020160142054 | 12/2016 |
| WO | WO2014010994 | 1/2014 |
| WO | WO2014065600 | 5/2014 |
| WO | WO2016129744 | 8/2016 |
| WO | WO2017030601 | 2/2017 |

OTHER PUBLICATIONS

Notice of Allowance in Chinese Appln. No. 201880017952.0, dated Oct. 19, 2022, 6 pages (with English translation).

* cited by examiner

METHOD FOR PERFORMING RANDOM ACCESS PROCEDURE BETWEEN TERMINAL AND BASE STATION IN WIRELESS COMMUNICATION SYSTEM, AND DEVICE SUPPORTING SAME

CROSS-REFERENCE TO RELATED APPLICATIONS

This application is a National Stage application under 35 U.S.C. § 371 of International Application No. PCT/KR2018/002924, filed on Mar. 13, 2018, which claims the benefit of U.S. Application No. 62/470,889, filed on Mar. 14, 2017, the disclosure of both are incorporated by reference.

TECHNICAL FIELD

The following description relates to a wireless communication system, and more particularly, to a method of performing a random access procedure between a user equipment and a base station in a wireless communication system and apparatus for supporting the same.

More specifically, the following description includes the description about a method of performing a random access procedure between a user equipment and a base station in a wireless communication system capable of transmitting/receiving signals through a plurality of beams.

BACKGROUND ART

Wireless access systems have been widely deployed to provide various types of communication services such as voice or data. In general, the wireless access system means a multiple access system that supports communication between multiple users by sharing available system resources (bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity for mobile broadband communication much improved than the existing radio access technology (RAT) has increased. In addition, massive machine type communications (MTC) capable of providing various services anytime and anywhere by connecting a number of devices or things to each other has been considered in the next generation communication system. Moreover, a communication system design capable of supporting services/UEs sensitive to reliability and latency has also been discussed.

The introduction of next generation RAT considering the enhanced mobile broadband communication, massive MTC, ultra-reliable and low latency communication (URLLC), etc. has been discussed.

DISCLOSURE OF THE INVENTION

Technical Task

One technical task of the present invention is to provide a method of performing a random access procedure between a user equipment and a base station in a wireless communication system and apparatus for supporting the same.

Another technical task of the present invention is to provide a method of performing a random access procedure between a user equipment and a base station in case that signals are transceived between the user equipment and the base station through a plurality of beams.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method and apparatuses for performing a random access procedure between a user equipment and a base station in a wireless communication system.

In one technical aspect of the present invention, provided herein is a method of performing a random access procedure with a base station by a user equipment in a wireless communication system, the method including receiving configuration information for a random access from the base station, the configuration information including information indicating a maximum number of simultaneously transmittable beams allowed for the user equipment or a maximum repetition count allowed for the user equipment during a predetermined time and based on the configuration information, transmitting Physical Random Access Channel (PRACH) using different beams of which number is equal to or smaller than a maximum number of the beams simultaneously transmittable by the user equipment at a specific timing point or transmitting the PRACH by sweeping different beams of which number is equal to or smaller than the maximum repetition count allowed for the user equipment during the predetermined time.

In another technical aspect of the present invention, provided herein is a user equipment in performing a random access procedure with a base station in a wireless communication system, the user equipment including a transmitting unit, a receiving unit, and a processor configured to operate by being connected to the transmitting unit and the receiving unit, wherein the processor is further configured to receive configuration information for a random access from the base station, wherein the configuration information includes information indicating a maximum number of simultaneously transmittable beams allowed for the user equipment or a maximum repetition count allowed for the user equipment during a predetermined time, and wherein based on the configuration information, the processor is further configured to transmit Physical Random Access Channel (PRACH) using different beams of which number is equal to or smaller than a maximum number of the beams simultaneously transmittable by the user equipment at a specific timing point or transmit the PRACH by sweeping different beams of which number is equal to or smaller than the maximum repetition count allowed for the user equipment during the predetermined time.

In the above configuration, if the user equipment transmits the PRACH using the different beams of which number is equal to or smaller than the maximum number of the beams simultaneously transmittable by the UE at the specific timing point based on the configuration information, the user equipment may use a same resource to transmit the PRACH using the different beams.

In this case, if the user equipment receives a Random Access Response (RAR) signal, the user equipment may transmit a signal corresponding to the RAR signal using a specific beam among all beams transmitted before reception of the RAR signal.

Or, if the user equipment transmits the PRACH using the different beams of which number is equal to or smaller than the maximum number of the beams simultaneously transmittable by the UE at the specific timing point based on the configuration information, the user equipment may use different resources to transmit the PRACH using the different beams.

In this case, the difference resources may include different frequency resources.

Or, the different resources may include resources based on different sequences.

Moreover, if the user equipment receives a Random Access Response (RAR) signal for a single beam among a plurality of beams used to transmit the PRACH simultaneously only, the user equipment may transmit a signal corresponding to the RAR signal using a beam corresponding to the received RAR signal.

Or, if the user equipment receives RAR signals for two or more of a plurality of beams used to simultaneously transmit the PRACH, the user equipment may determine whether the received RAR signals are RAR signals for the user equipment or another user equipment depending on whether a difference of Timing Advance (TA) information included in the received RAR signals for the two or more beams exceeds a predetermined threshold and then transmit a signal corresponding to one of the received RAR signals for the two or more beams based on the determination.

Moreover, if the user equipment fails to a Random Access Response (RAR) signal corresponding to all of a plurality of beams used to transmit the PRACH simultaneously, the user equipment may retransmit the PRACH using different beams, of which number is equal to or smaller than the maximum number of the beams simultaneously transmittable by the user equipment, other than a plurality of the beams.

Moreover, if the configuration information includes the information indicating the maximum number of the beams simultaneously transmittable by the user equipment, the configuration information may further include at least one of (A-1) information on a maximum value of a power sum of all the simultaneously transmitted beams, (A-2) information on a maximum allowable transmission power of each beam simultaneously transmittable by the user equipment, (A-3) information on a maximum add-up value of beam widths of all beams simultaneously transmittable by the user equipment, (A-4) information on a maximum beam width of each beam simultaneously transmittable by the user equipment, and (A-5) information on a minimum angle difference between beams simultaneously transmittable by the user equipment.

Or, if the configuration information includes the information indicating the maximum repetition count allowed for the user equipment during the predetermined time, the configuration information may further include at least one of (B-1) information on a maximum allowable value for a transmission power of each PRACH signal repeatedly transmitted by the user equipment during the predetermined time, (B-2) information on a maximum beam width of each beam corresponding to each PRACH signal repeatedly transmitted by the user equipment during the predetermined time, and (B-3) information on a minimum angle difference between beams corresponding to PRACH signals repeatedly transmitted by the UE during the predetermined time.

In another technical aspect of the present invention, provided herein is a method of performing a random access procedure with a user equipment by a base station in a wireless communication system, the method including transmitting configuration information for a random access to the user equipment through a first transmission beam, the configuration information including information indicating a maximum number of simultaneously transmittable beams allowed for the user equipment or a maximum repetition count allowed for the user equipment during a predetermined time and receiving a Physical Random Access Channel (PRACH) through a first reception beam corresponding to the first transmission beam from the user equipment operating based on the configuration information.

In further technical aspect of the present invention, provided herein is a base station in performing a random access procedure with a user equipment in a wireless communication system, the base station including a transmitting unit, a receiving unit, and a processor configured to operate by being connected to the transmitting unit and the receiving unit, wherein the processor is further configured to transmit configuration information for a random access to the user equipment through a first transmission beam, wherein the configuration information includes information indicating a maximum number of simultaneously transmittable beams allowed for the user equipment or a maximum repetition count allowed for the user equipment during a predetermined time, and wherein the processor is further configured to receive a Physical Random Access Channel (PRACH) through a first reception beam corresponding to the first transmission beam from the user equipment operating based on the configuration information.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, in case that a User Equipment (UE) and a base station transceive signals using a plurality of beams, the UE and base station can perform a random access procedure through a plurality of beams using a method according to the present invention.

The above-described aspects of the present disclosure are merely a part of preferred embodiments of the present disclosure. Those skilled in the art will derive and understand various embodiments reflecting the technical features of the present disclosure from the following detailed description of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE FOR INVENTION

Figure 1:
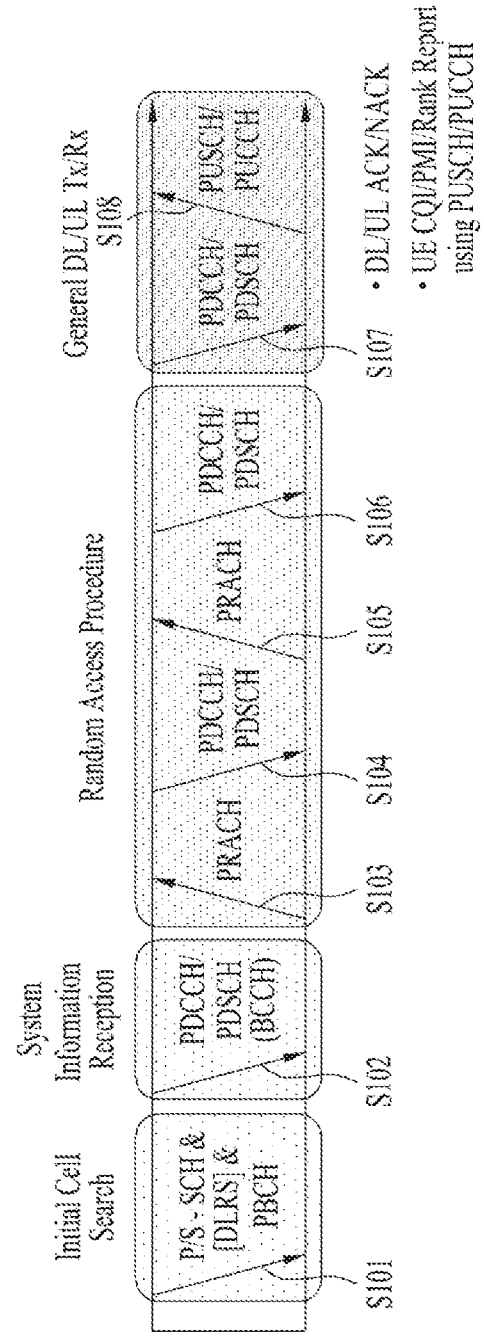
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36. 331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure, clear channel assessment (CCA), channel access procedure (CAP), for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an base station. Specifically, the UE synchronizes its timing to the base station and acquires information such as a cell Identifier (ID) by receiving a Primary Synchronization Channel (P-SCH) and a Secondary Synchronization Channel (S-SCH) from the base station.

Then the UE may acquire information broadcast in the cell by receiving a Physical Broadcast Channel (PBCH) from the base station.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the base station, the UE may perform a random access procedure with the base station (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a Physical Uplink Shared Channel (PUSCH) and/or a Physical Uplink Control Channel (PUCCH) to the base station (S18), in a general UL/DL signal transmission procedure.

Control information that the UE transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
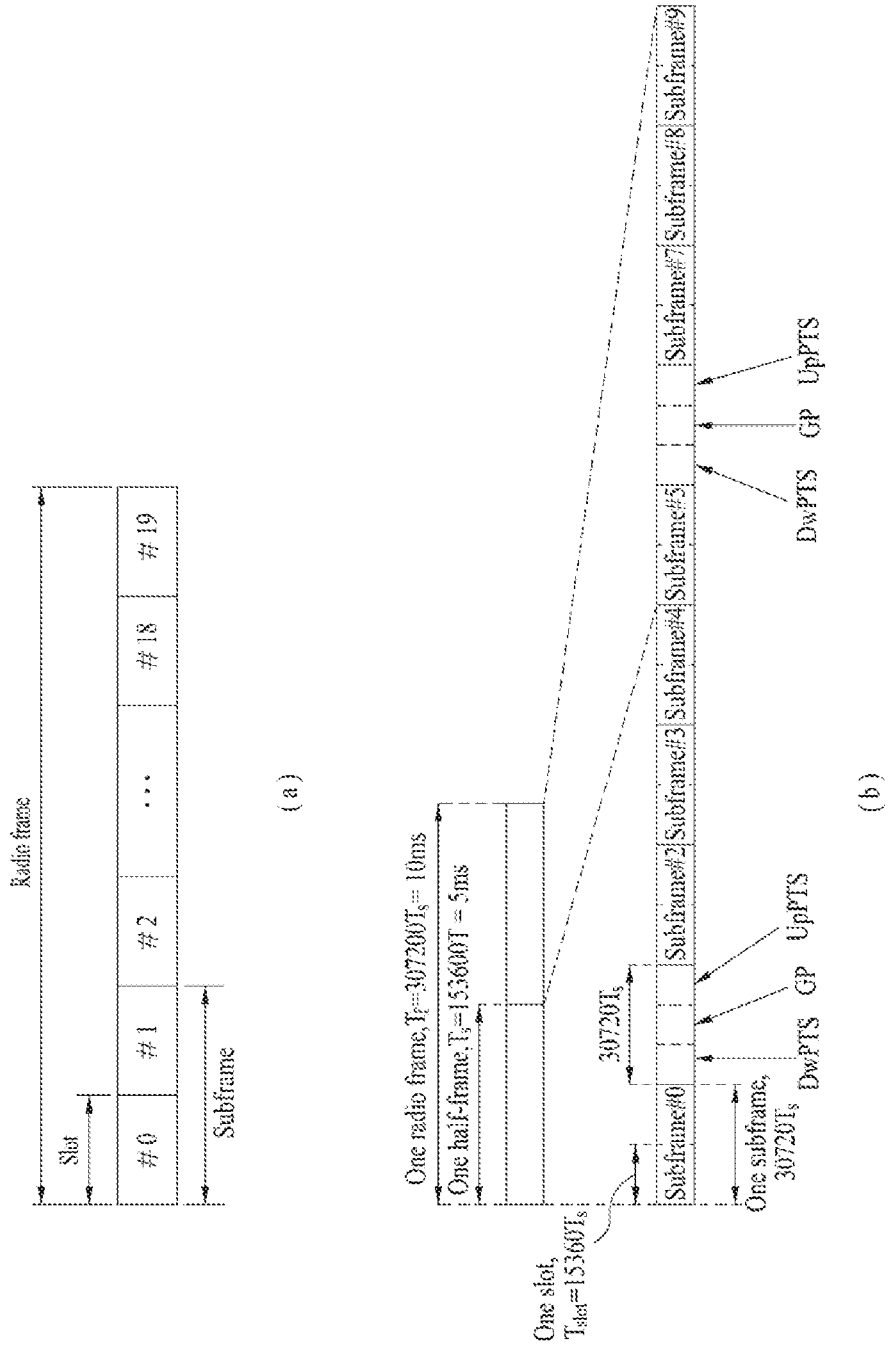
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at a base station. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the LTE Rel-13 system, it is newly added that the configuration of a special subframe (e.g., the lengths of DwPTS/GP/UpPTS) is established by considering the number of additional SC-FDMA symbols, X, which is provided by the higher layer parameter named "srs-UpPtsAdd" (if the parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.

Figure 3:
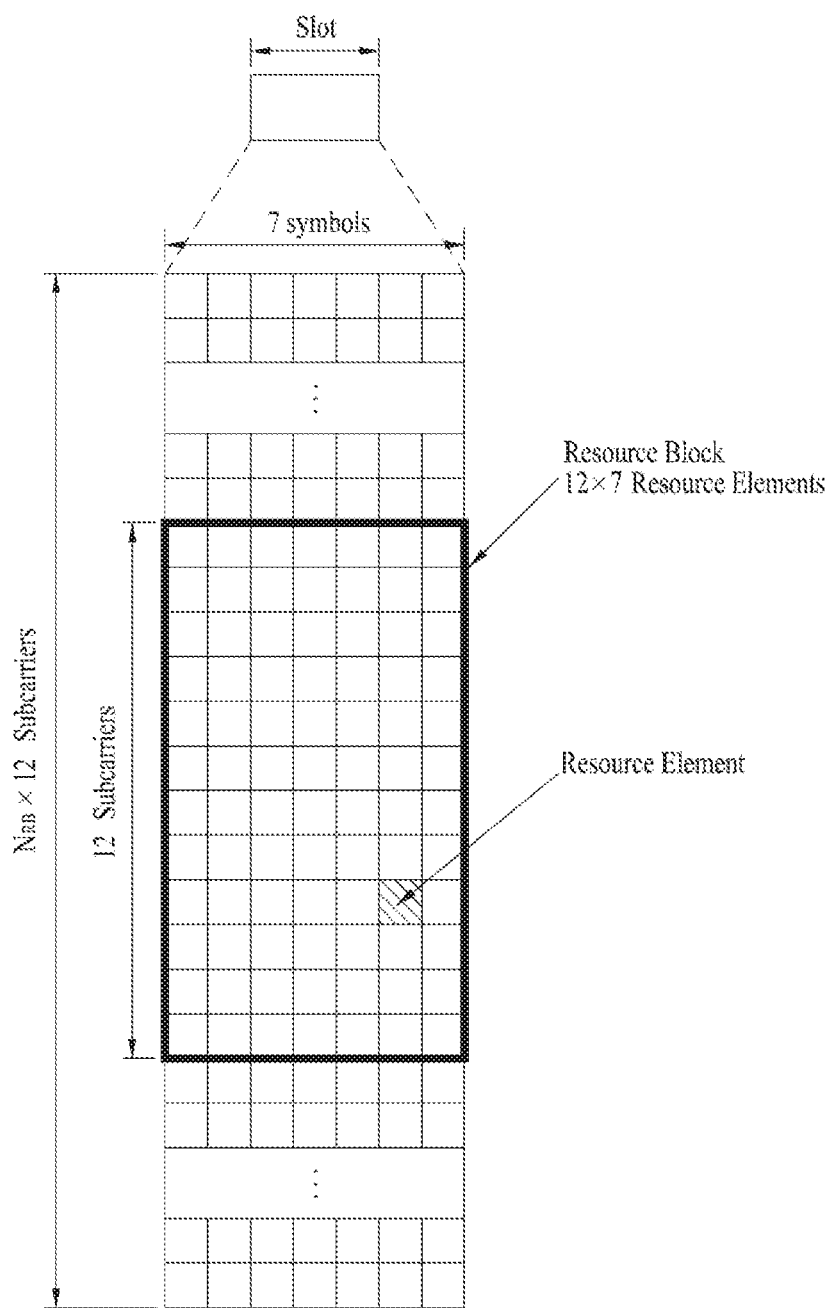
FIG. 3 is a diagram illustrating an exemplary resource grid for the duration of a downlink slot.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
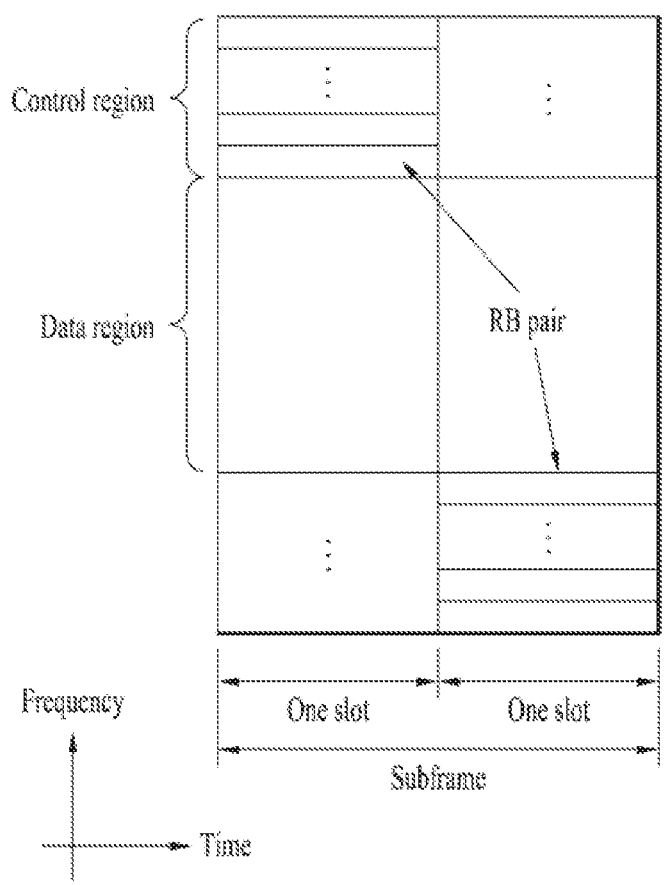
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
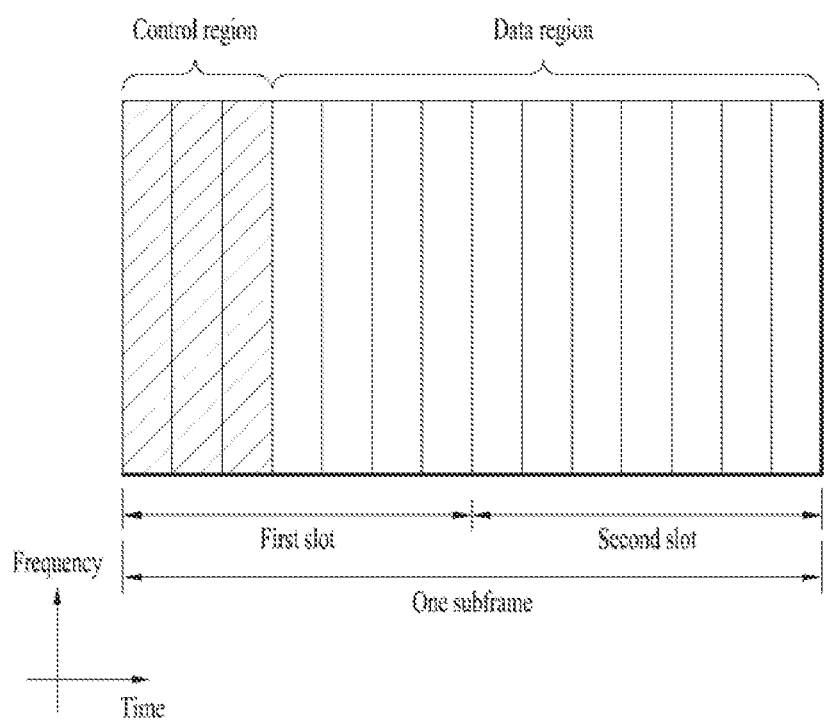
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

FIG. 3 illustrates an exemplary structure of a DL resource grid for the duration of one DL slot, which may be used in embodiments of the present disclosure.

the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices have required higher communication capacity, the necessity for the mobile broadband communication much improved than the existing RAT has increased. In addition, massive machine type communications (MTC) capable of providing various services anytime and anywhere by connecting a number of devices or things has also been considered. Moreover, a communication system design capable of supporting services/UEs sensitive to reliability and latency has been proposed.

The introduction of new RAT considering the enhanced mobile broadband communication, massive MTC, ultra-reliable and low-latency communication (URLLC), etc. has been discussed. In the present disclosure, the corresponding technology is referred to as new RAT or new radio (NR) for simplicity.

2.1. Numerologies

The NR system to which the present disclosure is applicable supports various OFDM numerologies as shown in Table 3 below. The value of $\mu$ and cyclic prefix information per carrier bandwidth part can be signaled for DL and UL, respectively. For example, the value of $\mu$ and cyclic prefix information for DL carrier bandwidth part may be signaled though higher layer signaling such as DL-BWP-mu and DL-MWP-cp. As another example, the value of $\mu$ and cyclic prefix information for UL carrier bandwidth part may be signaled though higher layer signaling such as UL-BWP-mu and UL-MWP-cp.

TABLE 3

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2. Frame Structure

DL and UL transmission are configured with frames each having a length of 10 ms. Each frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

Each frame may include two half-frames with the same size. In this case, the two half-frames may include subframes 0 to 4 and subframes 5 to 9, respectively.

Regarding the subcarrier spacing slots may be numbered within one subframe in ascending order as follows: $n_s^\mu \in \{0, \ldots, N_{slot}^{subframe,\mu}-1\}$ and may also be numbered within a frame in ascending order as follow: $n_{s,f}^\mu \in \{0, \ldots, N_{slot}^{frame,\mu}-1\}$. In this case, the number of consecutive OFDM symbols in one slot ($N_{symb}^{slot}$) may be determined as shown in Tables 4 and 5 below according to the cyclic prefix.

The start slot ($n_s^\mu$) of a subframe is aligned with the start OFDM symbol ($n_s^\mu N_{symb}^{slot}$) of the corresponding subframe in the time domain. Table 4 shows the number of OFDM symbols in each slot/frame/subframe in the case of a normal cyclic prefix, and Table 5 shows the number of OFDM symbols in each slot/frame/subframe in the case of an extended cyclic prefix.

TABLE 4

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

The NR system to which the present disclosure is applicable may employ a self-contained slot structure as the above-described slot structure.

Figure 6:
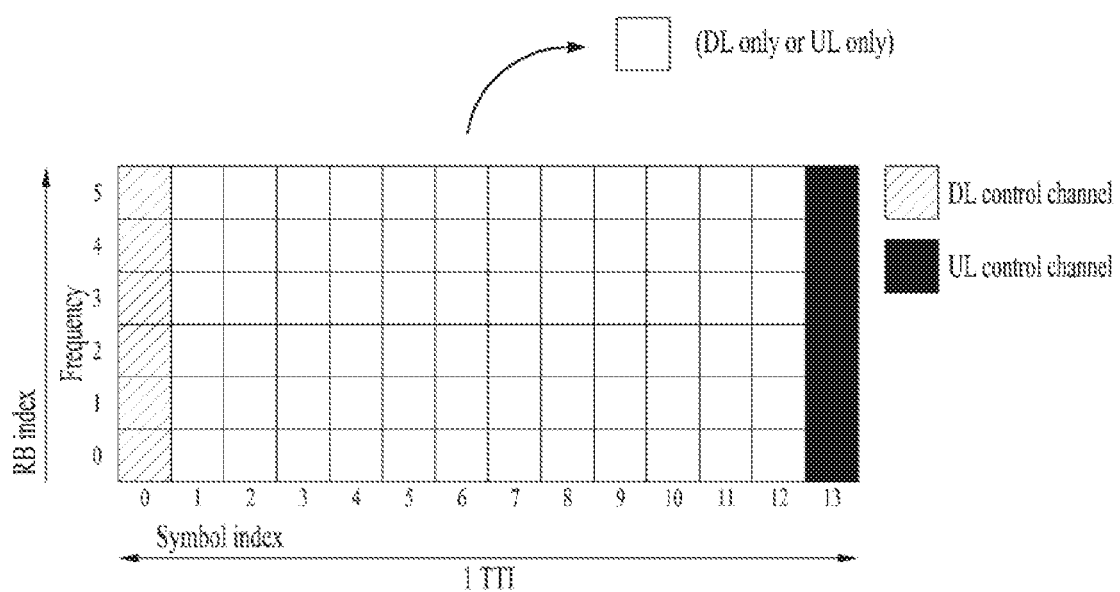
FIG. 6 is a diagram illustrating a self-contained subframe structure applicable to the present disclosure.

FIG. 6 is a diagram illustrating a self-contained subframe structure applicable to the present disclosure.

In FIG. 6, the hatched region (e.g., symbol index=0) represents a DL control region, and the black region (e.g., symbol index=13) represents an UL control region. The other region (e.g., symbol index=1 to 12) may be used for DL data transmission or for UL data transmission.

Based on the self-contained slot structure, a BS and a UE may sequentially perform DL transmission and UL transmission in one slot. That is, the BS and UE may transmit and receive not only DL data but also UL ACK/NACK for the DL data in one slot. The self-contained slot structure may reduce a time required for data retransmission when a data transmission error occurs, thereby minimizing the latency of the final data transmission.

In the self-contained slot structure, a time gap with a predetermined length is required to allow the BS and UE to switch from transmission mode to reception mode or vice versa. To this end, some OFDM symbols at the time of switching from DL to UL may set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 6.

For example, a slot may have various slot formats. In this case, OFDM symbols in each slot can be classified into a DL symbol (denoted by '13'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

2.3. Analog Beamforming

In a millimeter wave (mmW) system, since a wavelength is shortened, a plurality of antenna elements may be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent BF per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective BF is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
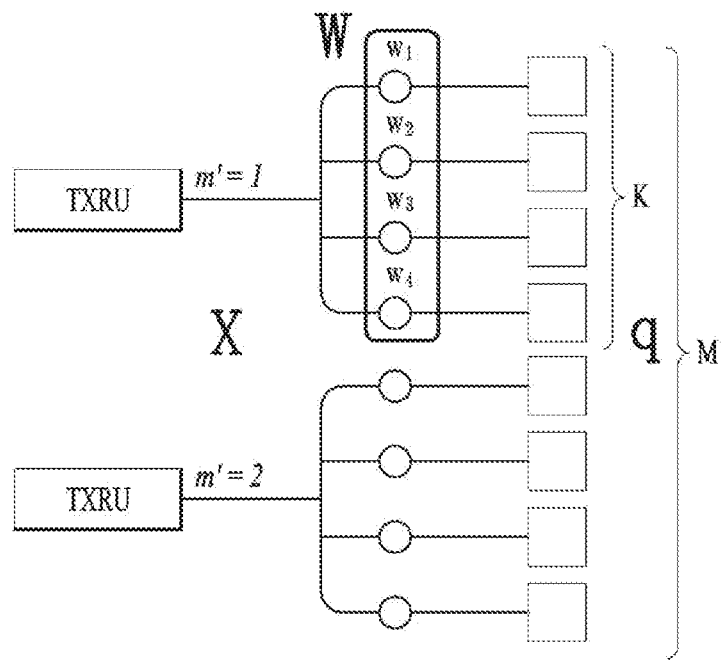
FIGS. 7 and 8 are diagrams illustrating representative methods for connecting TXRUs to antenna elements.
Figure 8:
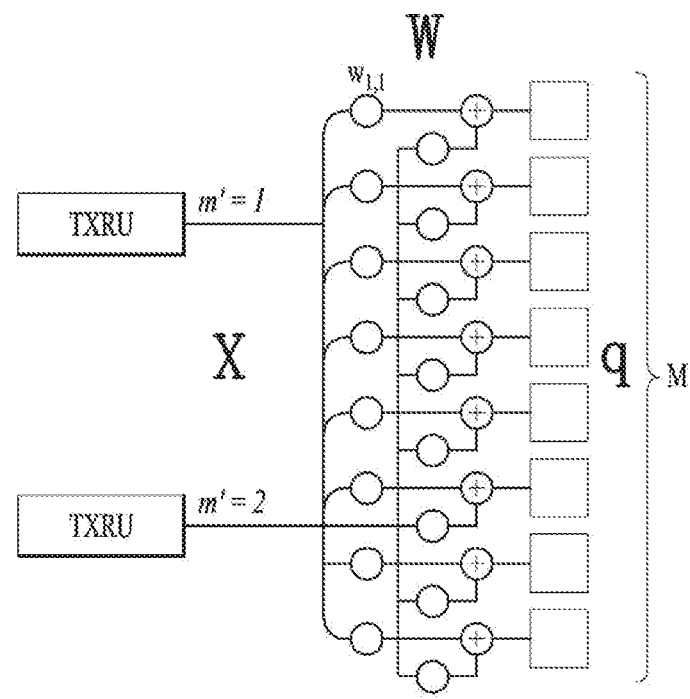

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog BF. In this case, the mapping relationship between CSI-RS antenna ports and TXRUs may be 1:1 or 1-to-many.

The configuration shown in FIG. 7 has a disadvantage in that it is difficult to achieve BF focusing but has an advantage in that all antennas can be configured at low cost.

On the contrary, the configuration shown in FIG. 8 is advantageous in that BF focusing can be easily achieved. However, since all antenna elements are connected to the TXRU, it has a disadvantage of high cost.

When a plurality of antennas is used in the NR system to which the present disclosure is applicable, the hybrid BF obtained by combining the digital BF and analog BF may be applied. In this case, the analog BF (or radio frequency (RF) BF) means an operation of performing precoding (or combining) at the RF stage. In the hybrid BF, precoding (or combining) is performed at each of the baseband stage and RF stage, respectively. Thus, the hybrid beamforming is advantageous in that it can guarantee performance similar to the digital BF while reducing the number of RF chains and the number of D/A (digital-to-analog) (or A/D (analog-to-digital) converters.

For convenience of description, a hybrid BF structure may be represented by N transceiver units (TXRUs) and M physical antennas. In this case, digital BF for L data layers to be transmitted by a transmission end may be represented by an N-by-L matrix. Thereafter, N converted digital signals are converted into analog signals by the TXRUs, and then analog BF, which is represented by an M-by-N matrix, is applied the converted signals.

Figure 9:
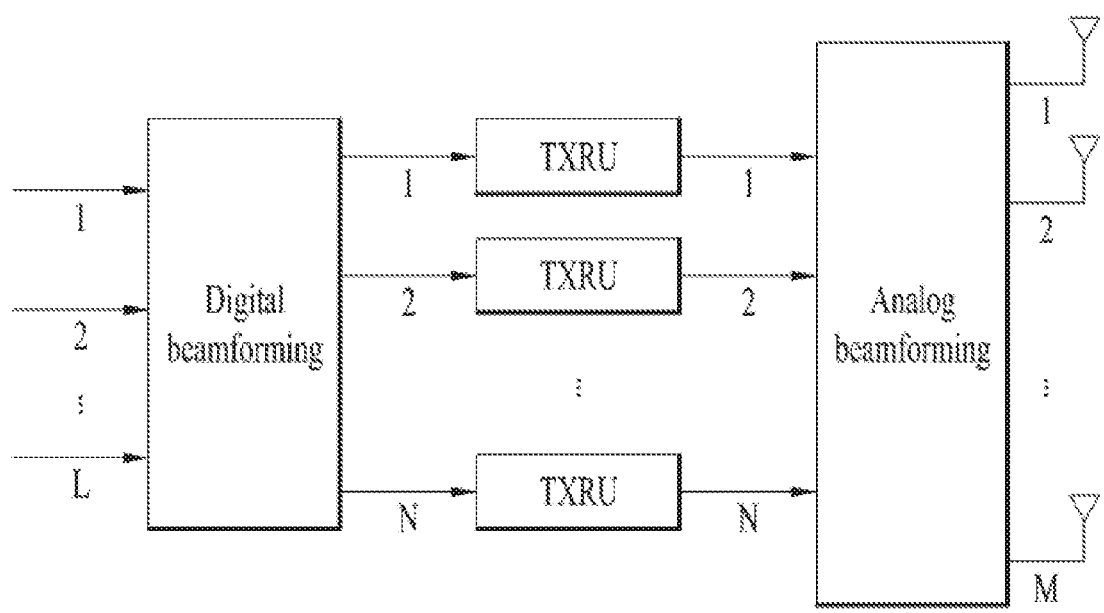
FIG. 9 is a diagram schematically illustrating a hybrid beamforming structure from the perspective of transceiver units (TXRUs) and physical antennas according to an embodiment of the present disclosure.

FIG. 9 is a diagram schematically illustrating a hybrid beamforming structure from the perspective of TXRUs and physical antennas according to an embodiment of the present disclosure. In FIG. 9, the number of digital beams is L and the number of analog beams is N.

Additionally, to provide more efficient BF to UEs located in a specific area, a method of designing a BS capable of changing analog BF on a symbol basis has been considered in the NR system to which the present disclosure is applicable. Further, the NR system to which the present disclosure is applicable has considered the introduction of a plurality of antenna panels to which independent hybrid BF is applicable by defining N specific TXRUs and M RF antennas as one antenna panel as illustrated in FIG. 9.

When a BS uses a plurality of analog beams as described above, each UE has a different analog beam suitable for signal reception. Thus, the NR system to which the present disclosure is applicable has considers the beam sweeping operation where a BS transmits signals (at least synchronization signals, system information, paging, etc.) by applying a different analog beam to each symbol within a specific subframe (SF) so that all UEs may have reception opportunities.

Figure 10:
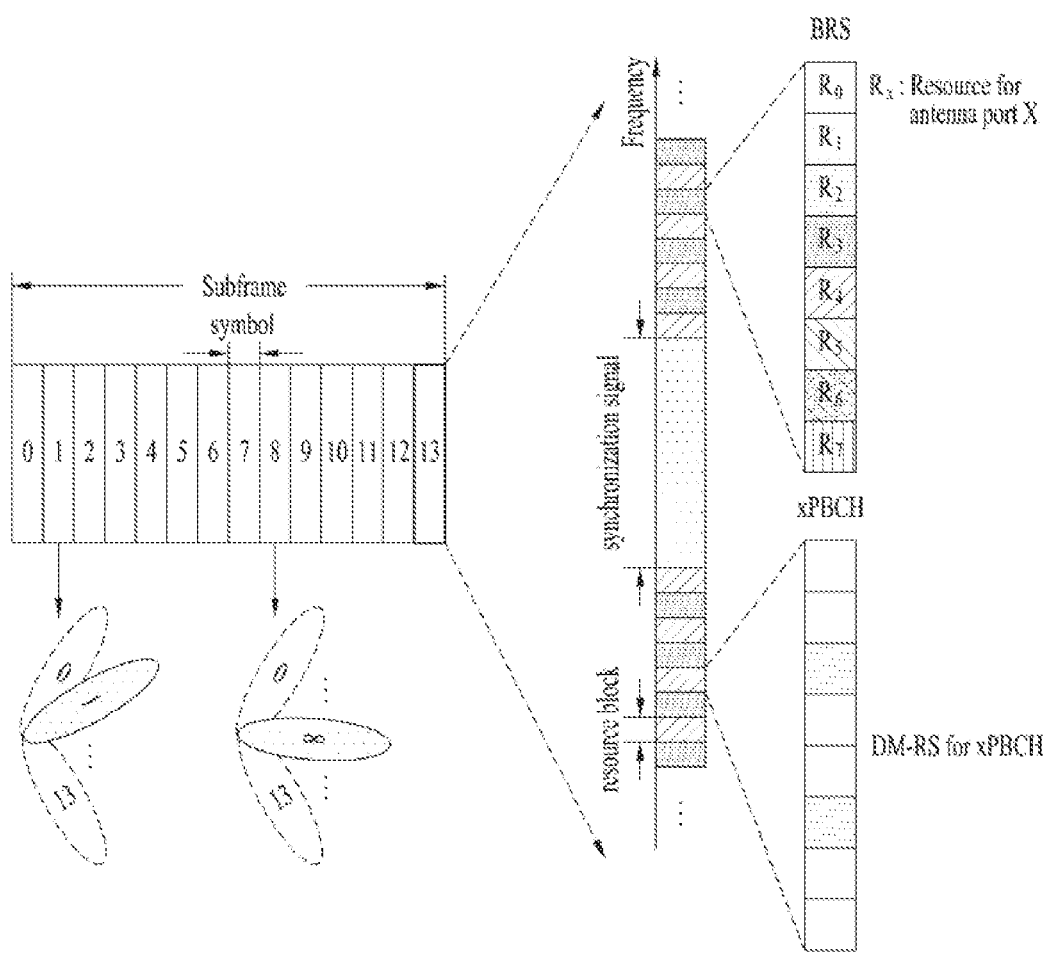
FIG. 10 is a diagram schematically illustrating beam sweeping operation for synchronization signals and system information in a downlink (DL) transmission process according to an embodiment of the present disclosure.

FIG. 10 is a diagram schematically illustrating beam sweeping operation for synchronization signals and system information in DL transmission process according to an embodiment of the present disclosure.

In FIG. 10, a physical resource (or channel) for transmitting system information of the NR system to which the present disclosure is applicable in a broadcasting manner is referred to as an xPBCH. In this case, analog beams belonging to different antenna panels may be simultaneously transmitted in one symbol.

In addition, to measure a channel for each analog beam, the introduction of a beam reference signal (BRS), which is a reference signal (RS) to which a single analog beam (corresponding to a specific antenna panel) is applied, has been discussed in the NR system to which the present disclosure is applicable. The BRS may be defined for a plurality of antenna ports, and each BRS antenna port may correspond to a single analog beam. In this case, in contrast to the BRS, all analog beams in an analog beam group may be applied to a synchronization signal or xPBCH to assist a random UE to correctly receive the synchronization signal or xPBCH.

3. Proposed Embodiment

In the following, the configuration proposed by the present invention is described in detail based on the above-described technical idea.

Particularly, in the present invention, a random access procedure of a UE for which reciprocity of Transmission/Reception (Tx/Rx) beams is not established is described in detail. Here, 'beam reciprocity' may mean that cross correlation for directivity is established between an Rx beam and a Tx beam. Particularly, in 3GPP NR system to which the present invention is applicable, 'Tx/Rx beam correspondence' can be utilized as a term corresponding to 'beam reciprocity'. Hence, such terms can be used in a manner of being switched to each other.

First of all, 'Tx/Rx beam correspondence' in a Transmission Reception Point (TRP) and a UE can be defined as follows.

(1) Tx/Rx beam correspondence at TRP holds if at least one of the following is satisfied.

TRP is able to determine a TRP Rx beam for the uplink reception based on UE's downlink measurement on TRP's one or more Tx beams.

TRP is able to determine a TRP Tx beam for the downlink transmission based on TRP's uplink measurement on TRP's one or more Rx beams.

(2) Tx/Rx beam correspondence at UE holds if at least one of the following is satisfied.

UE is able to determine a UE Tx beam for the uplink transmission based on UE's downlink measurement on UE's one or more Rx beams.

UE is able to determine a UE Rx beam for the downlink reception based on TRP's indication based on uplink measurement on UE's one or more Tx beams.

Moreover, in case of a beamforming supportive system like an NR system to which the present invention is applicable, a UE's random access procedure may be defined as a different procedure depending on a presence or non-presence of the establishment of 'Tx/Rx reciprocity' between a Base Station (BS) and a UE.

Generally, penalty may be imposed on a 'Tx/Rx reciprocity' unestablished UE in a random access procedure in comparison with a 'Tx/Rx reciprocity' established UE.

Here, as a penalty imposing method, various methods are considerable. For example, such penalties may include 1) restriction on random access attempt frequency and resource and 2) design to generate a relatively long time until random access procedure completion by putting specific restrictions on repetitive transmission of a random access signal and channel.

Such operations may be configured to promote the design of a 'Tx/Rx reciprocity' established UE. So to speak, the above-described operation may be the configuration that reflects the intention to encourage that a beamforming operation is used more effectively as a signal transceiving method of a BS and UE after a random access process of the UE.

Particularly, a 'Tx/Rx reciprocity' unestablished UE may cause interference to an adjacent BS in a random access process. Thus, to correct the interference, an additional procedure such as beam-refinement may be required.

Yet, it may be preferable that a random access procedure, which has a differential penalty according to the number of Tx beams possible to be simultaneously generated from each UE (e.g., the number of antenna panels, etc.) and/or property of a beam pattern (e.g., sharpness, a power ratio between a main-lobe and a side-lobe) and/or a distance between a BS and a UE, etc., applies to a UE even if such a UE is a 'Tx/Rx reciprocity' unestablished UE. So to speak, although 'Tx/Rx reciprocity' is not established for a specific UE, if a random access procedure is performed by imposing a differential penalty in a range in which the specific UE does not cause excessive interference to an adjacent BS or a beam (of another UE or BS), an operation of the adjacent BS or another UE may not be considerably affected. Here, the specific UE may include a UE supportive of a multi-antenna panel capable of forming beams in several directions at a time.

Accordingly, a random access procedure capable of applying a differential and adaptive penalty to a 'Tx/Rx reciprocity' unestablished UE and a detailed configuration therefor are described in the present invention as follows.

Figure 11:
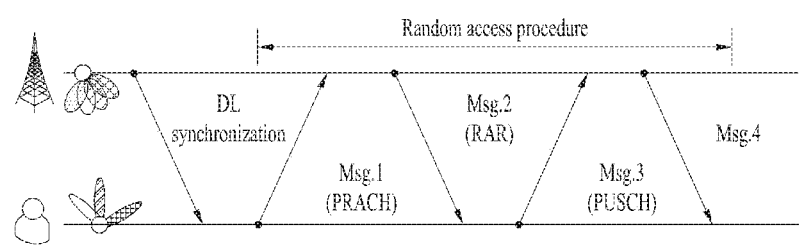
FIG. 11 is a diagram schematically showing a random access procedure applicable to the present invention.

FIG. 11 is a diagram schematically showing a random access procedure applicable to the present invention.

Here, the configuration of FIG. 11 may correspond to the operations S13 to S16 of FIG. 1, matters redundant with the former description shall be omitted from the following.

In the present invention, the configuration proposed centering on an initial random access procedure shown in FIG. 11 regarding a random access procedure is described. Prior to the initial random access procedure, a UE is assumed as having obtained all configurations related to Downlink (DL) time/frequency synchronization and random access.

Here, random access related configuration information may include Physical Random Access Channel (PRACH) time/frequency resource configuration for msg. 1 explicitly notified by a BS, Rx beam information of a BS corresponding to it, msg.2 Random Access Response (RAR) window expecting a response to the msg.1, etc. In this case, a PRACH time resource may be associated with a DL Tx beam of the BS. So to speak, using information of a best beam-pair (e.g., a BS Tx beam received with highest power or the like and a UE Rx beam formed correspondingly, etc.) obtained in a downlink synchronization process or the like, a UE can transmit PRACH by selecting a Tx beam corresponding to a UE Rx beam of the best beam-pair from PRACH time resource (e.g., Synchronization Signal-block (SS-block) and PRACH time/frequency resource are associated with each other and the SS-block may be associated with a BS Tx beam) corresponding to a BS Tx beam of the best beam-pair. Here, the SS-block may be transmitted in a manner that a multitude of narrow beams are set as a single wide beam group by the BS. In this case, the wide beam group may correspond to a specific msg.1 PRACH Rx beam.

Yet, in case of a 'Tx/Rx reciprocity' unestablished UE, the UE is unable to select a Tx beam corresponding to a UE Rx beam of a best beam-pair. Hence, the UE should transmit PRACH by selecting a Tx beam formed in a random direction.

Since the above-described operation of the UE may cause a problem of causing interference to an adjacent BS and the like, the 'Tx/Rx reciprocity' unestablished UE may have restriction put on a new PRACH transmission until an RAR window interval for a previously transmitted PRACH signal is terminated.

Of course, if RAR is detected within the corresponding interval (e.g., RAR window), the UE can continue to progress the random access procedure by sending msg.3. Yet, as UEs having sent the same msg.1 may receive msg.2 simultaneously and then send msg.3, the 'Tx/Rx reciprocity' unestablished UE may still cause interference to an adjacent beam or BS.

Thus, until contention resolution is completed through msg.4, it is unable to avoid the interference problem of the 'Tx/Rx reciprocity' unestablished UE. And, the 'Tx/Rx reciprocity' unestablished UE may have a problem that the random access execution time increases in proportion to the number of independent beams that can be formed by the UE. As the above-mentioned problem is applicable irrespective of interference power, which may be potentially triggered by the 'Tx/Rx reciprocity' unestablished UE and caused to an adjacent beam or BS, and probability thereof, the random access execution time of the 'Tx/Rx reciprocity' unestablished UE may increase excessively in some cases.

Accordingly, in the present invention, a specific method of adjusting a random access execution time of a 'Tx/Rx reciprocity' unestablished UE adaptively or flexibly is described in detail.

Particularly, considering interference effect on an adjacent beam or BS, the following elements are considerable for a differential random access procedure for a 'Tx/Rx reciprocity' unestablished UE.

Based on FIGS. 12 to 16, the configuration of the present invention is described in detail as follows.

Figure 12:
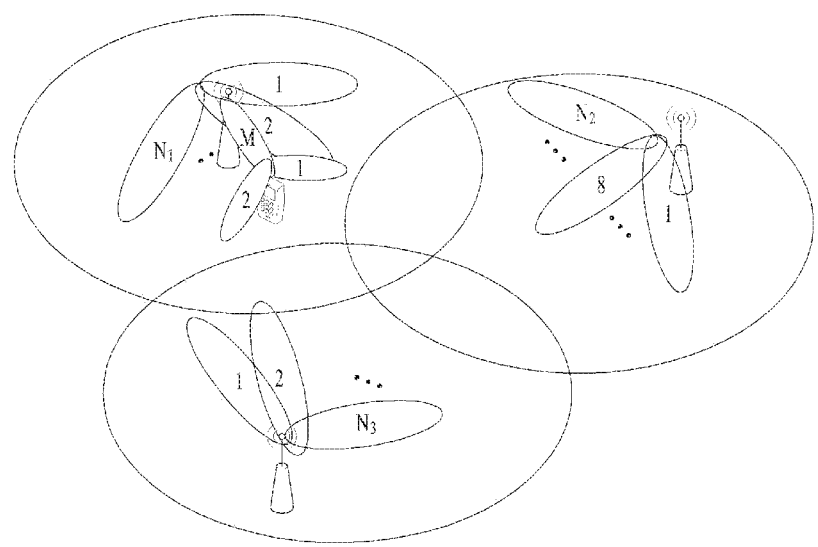
FIGS. 12 to 14 are diagrams schematically showing a transceiving scenario for a multitude of beams in a beamforming system to which the present invention is applicable.
Figure 13:
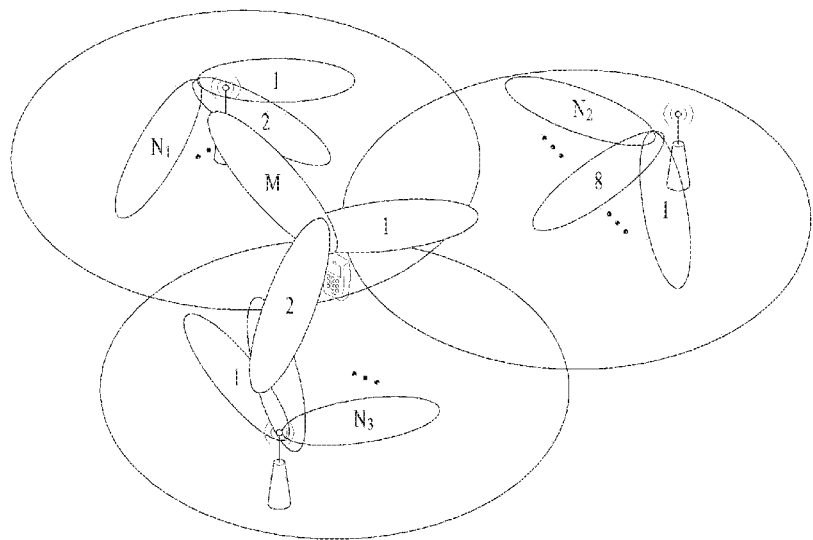
Figure 14:
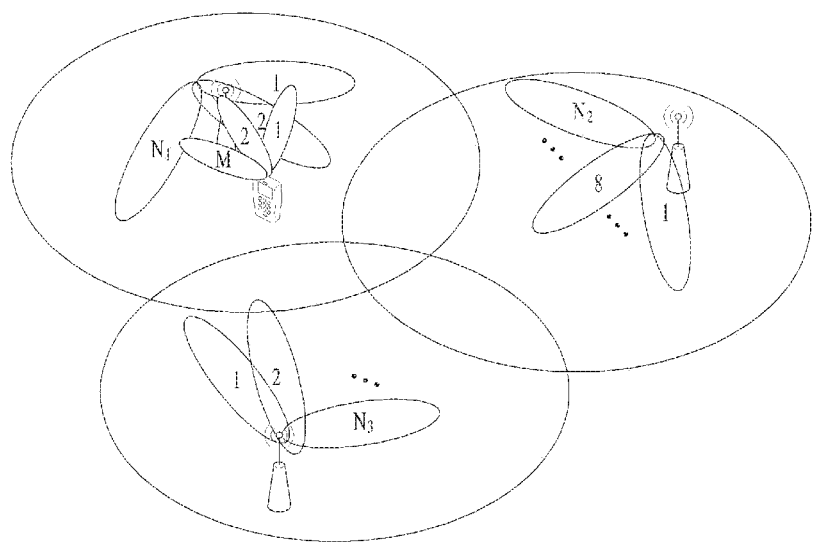

FIGS. 12 to 14 are diagrams schematically showing a transceiving scenario for a multitude of beams in a beamforming system to which the present invention is applicable. Here, assume that multi-beamforming is supported for all BSs and UE. Hence, assume that a UE can generate M beams. And, assume that BSs can generate N1 beams, N2 beam and N3 beams, respectively.

Compared to FIG. 13, FIG. 12 shows a scenario that PRACH transmission power is relatively low because a distance between a UE and a target BS is relatively short. Hence, in case of FIG. 12, a probability of causing interference to an adjacent BS or beam may be relatively low in comparison to FIG. 13.

FIG. 14 shows a scenario that the direction (or coverage) of M beams formed by a UE is relatively small despite PRACH transmission power of the UE is similar in comparison to FIG. 12. In this case, since a probability that the M beams of the UE cause interference to a multitude of Rx beams of a specific BS, the BS may induce interference avoidance in a manner of configuring a minimum interval (or direction) as an interval between M PRACH Tx beams or configuring only a single beam to be generated in a specific range (or angle).

Figure 15:
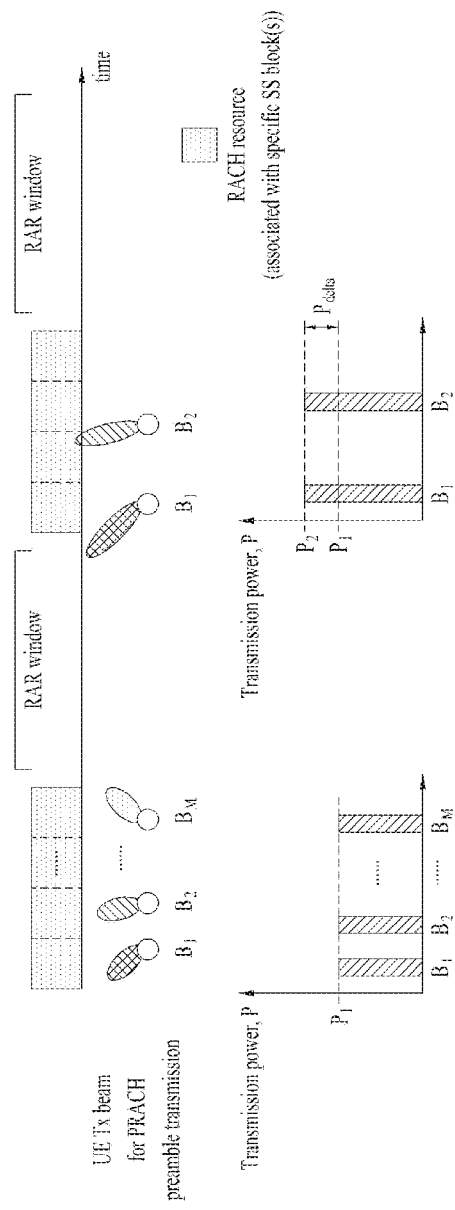
FIG. 15 is a diagram schematically showing the configuration of transmitting a PRACH signal using a plurality of beams before a single RAR signal reception interval (e.g., RAR window interval).

FIG. 15 is a diagram schematically showing the configuration of transmitting a PRACH signal using a plurality of beams before a single RAR signal reception interval (e.g., RAR window interval). So to speak, FIG. 15 is a diagram to describe 'single PRACH preamble attempt' of a UE before an RAR window interval and an operation related to PRACH repetitive transmission according to it. Here, 'single RACH preamble attempt' may be defined as follows.

PRACH preamble transmission over a single RACH resource is a single PRACH preamble attempt and the repetition (or beam sweeping if supported) within a RACH resource is also assumed a single PRACH preamble attempt. Rather, PRACH preamble attempt on the different RACH resource or different occasion should be assumed as another RACH preamble attempt, which can be understood as a PRACH retransmission.

A UE applicable to the present invention may transmit PRACH using a multitude of beams in a specific time or repeatedly transmit a multitude of PRACH by Time Division Multiplexing (TDM) in a manner of forming an independent beam (or a single beam) per specific time interval like FIG. 15. In doing so, although the UE maintains the same power value for the power of a PRACH signal repeatedly transmitted before the RAR window, as the UE fails in RAR detection, when the UE performs a next 'PRACH transmission attempt', the UE can transmit PRACH with a power higher than that of the previous transmission. Yet, the number of PRACH beams repeatedly transmittable may be configured to decrease in inverse proportion to the increased PRACH transmission power or a time interval between the repeated PRACH beam transmissions may increase.

In doing so, regarding the PRACH beam repeated by being TDMed, Frequency Division Multiplexing (FDM) method may be applicable for the hopping in frequency domain.

The TDM or FDM method may be used as a scheme for mitigating interference between UEs or a method for classifying a PRACH beam.

Figure 16:
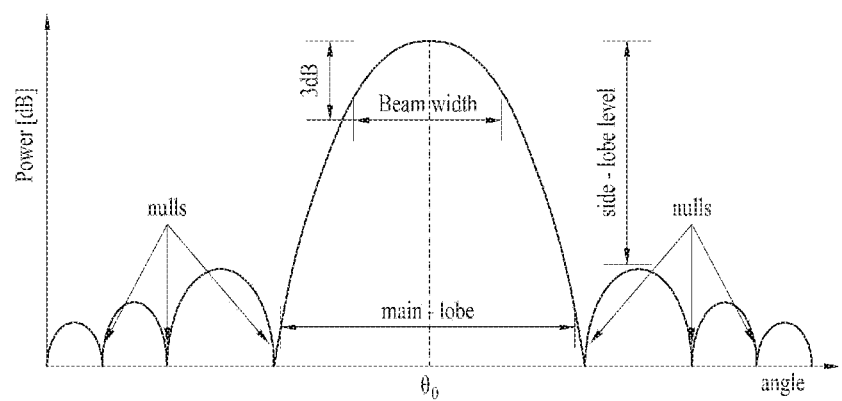
FIG. 16 is a diagram showing a power response to an angle of a transmission beam if a UE or base station forms the transmission beam in a direction $\theta_0$.

FIG. 16 is a diagram showing a power response to an angle of a Tx beam if a UE or BS forms the Tx beam in a direction $\theta_0$.

Generally, a Tx beam has the biggest power in a direction $\theta_0$. In FIG. 16, a range of an angle having a power within 3 dB in comparison to an output power of the direction $\theta_0$ in a main lobe can be named a beam width. A beam response interval except a first null angle of both ends of the main lobe can be named a side lobe. And, a difference between the biggest output power in the side lobe and the output power of the direction $\theta_0$ can be named a side lobe level.

In the following, based on the configurations shown in FIGS. 12 to 16, elements considerable for a differential random access procedure for a 'Tx/Rx reciprocity' unestablished UE are described in detail.

1. 'Distance Between an RACH Transmitting UE and a Receiving BS'

As shown in FIG. 12, a UE located in a distance close to a BS transmits a PRACH signal using PRACH transmission power relatively lower than that of the case shown in FIG. 13. Hence, the transmitted PRACH signal has low probability that interference will be caused to another adjacent BS.

Therefore, the BS may differently set the PRACH transmission attempt count allowable before a single RAR window interval end according to PRACH transmission power of the UE. Namely, a UE having a relatively low transmission power may be configured to attempt more PRACH transmissions before a single RAR window interval end than a UE not having a relatively low transmission power.

As specific methods for the above operation, it is able to consider: 1) a method of allowing a single UE to simultaneously transmit a PRACH signal having a low transmission power using a multitude of beams; and 2) a method of allowing the single UE to transmit a multitude of PRACH signals having different beam directions before an RAR window interval despite allowing a single beam transmission only for a single PRACH signal transmission.

In the former case, a method of allowing M (e.g., the number of beams simultaneously transmittable by a UE) in FIG. 12 and M in FIG. 13 differently according to a transmission power may be applicable. For example, the M in FIG. 12 may be set greater than the M in FIG. 13. In the latter case, a method of restricting a transmission attempt count of PRACH before an RAR window interval in inverse proportion to the transmission power increase due to RAR detection failure may be applicable.

In this case, a format of the PRACH and/or a coverage of the PRACH may be set different according to a distance between an RACH transmitting UE and a receiving BS.

2. 'Width (or Number of Antenna Panels) or Inter-Beam Angle Difference of UE's Beams Formed for PRACH Transmission'

Although a transmission power of a direction-$\theta_0$ PRACH beam of a UE is set low, interference may be caused to an adjacent beam of a BS depending on a width of the Tx beam.

Therefore, the BS can differently set the count of PRACH transmission attempts allowable before an RAR window interval end or the number of simultaneously transmittable beams according to a PRACH Tx beam width of the UE. Namely, regarding UEs having the same PRACH transmission power, in case of comparing a UE having a relatively narrow beam width with a UE not having the relatively narrow beam width, the UE having the relatively narrow beam width may attempt more PRACH transmissions before a single RAR window interval end or attempt a PRACH transmission by forming more beams simultaneously. Alternatively, the BS may set the UE having the relatively narrow beam width to attempt more PRACH transmissions before a single RAR window interval end or a PRACH transmission by forming more beams simultaneously.

3. 'Width (or Number of Antenna Panels) of BS's Beam Formed for RACH Reception'

Generally, a UE transmits (or is configured to transmit) a PRACH signal by compensating for power amounting to a pathloss between a BS and the UE. Accordingly, in aspect of a receiving BS irrespective of transmission power of a PRACH signal of a specific UE, PRACH signals of different UEs are received with similar power.

Yet, in a system assuming that a plurality of beams are formed, interference may be caused between adjacent Rx beams according to a width of a beam formed for PRACH reception of a BS or an extent of beam overlapping among a multitude of antenna panels.

So, a BS according to the present invention may set the PRACH transmission attempt count allowable before a single RAR window interval end differently according to a beam width of its own or an inter-antenna panel beam overlapping extent. Namely, the BS may put specific restrictions on a PRACH operation of a UE in consideration of the property of an Rx beam that can be formed by the BS.

In the present invention, a BS can set the M value of FIG. 14 to be different from the M value of FIG. 12 by the various methods mentioned in the foregoing description.

Considering the above-described various methods, a BS can induce or allow the following operations for PRACH transmission of a UE.

(1) 'Method of Allowing PRACH Transmission Using a Multitude of Beams at a Specific Timing'

<1>'Method of Transmitting PRACH in a Manner that Each Beam Uses the Same Resource'

The above method has a disadvantage that a beam corresponding to a received RAR cannot be specified in case of RAR reception of a UE. Of course, the UE can send msg.3 by starting an initial random access process for all beams transmitted before the RAR reception only or selecting a specific beam from all beams transmitted before the RAR reception.

Such an operation may be allowed for a specific UE in a range allowed in the standard technologies such as 3GPP standards and the like without special restrictions or performed by the specific UE.

<2>'Method of transmitting PRACH in a manner that each beam uses a different resource'

According to the above method, a UE may transmit PRACH using a multitude of beams at a specific timing and then attempt RAR detection corresponding to each beam within an RAR window. Here, each beam may be distinguished by FDM using a different frequency resource or by Code Division Multiplexing (CDM) using a different sequence.

Moreover, the number of beams transmittable at a specific timing may be restricted on specific conditions and restrictions may be put on the sane number of beams according to a width of beam, an inter-beam angle difference or the like. Such restriction conditions may be predefined by the standard technologies such as 3GPP standards and the like, configured cell-commonly by a BS, or configured through random access resource configuration information from a BS.

In this case, the RAR reception may be classified into various cases in the following and a UE can correspondingly perform the following operations.

A) 'Case that an RAR for One of a Multitude of Transmitted Beams is Received Only'

A UE can start an msg.3 transmission by selecting a beam corresponding to a received RAR.

B) 'Case that RAR for at Least One of a Multitude of Transmitted Beams is Received'

In this case, a UE may not be able to distinguish whether all of a multitude of the received RARs are responses to a multitude of the beams transmitted by the UE or an RAR for a PRACH signal transmitted by another UE by selecting the same resource. If so, each UE can perform the following operations.

B-1) 'Case that a Difference of Timing Advance (TA) Information Included in a Multitude of RARs Corresponding to Beams Transmitted by a UE is Equal to or Smaller than a Specific Value'

A UE may determine that all the detected RARs are the information on a multitude of beams simultaneously transmitted by the UE and then send msg.3 by selecting one RAR randomly or send msg.3 corresponding to a plurality of RARs.

In this case, in case that the UE sends a plurality of msg.3s, the UE may progress contention resolution by attempting detection of all msg.4s corresponding to the msg.3s. Here, the number of the plurally transmittable msg.3s may be predefined by the standard technologies such as 3GPP standards and the like, configured cell-commonly by a BS, or configured through random access resource configuration information from a BS. And, the number of the plurally transmittable msg.3s may be set smaller than the number of beams capable of simultaneously transmitting PRACH that is the msg. 1.

B-2) 'Case that a Difference of Timing Advance (TA) Information Included in a Multitude of RARs Corresponding to Beams Transmitted by a UE is Greater than a Specific Value'

A UE determines that a multitude of detected RARs may be information on PRACH signals simultaneously transmitted from different terminals including the UE and may then send msg.3 by selecting one RAR randomly or send msg.3 corresponding to a plurality of RARs.

In this case, in case that the UE sends a plurality of msg.3s, the UE may progress contention resolution by attempting detection of all msg.4s corresponding to the msg.3s. Here, the number of the plurally transmittable msg.3s may be predefined by the standard technologies such as 3GPP standards and the like, configured cell-commonly by a BS, or configured through random access resource configuration information from a BS. And, the number of the plurally transmittable msg.3s may be set smaller than the number of beams capable of simultaneously transmitting PRACH that is the msg. 1.

C) 'Case that RAR for any One of a Multitude of Transmitted Beams is not Receivable (or not Received)'

A UE can progress the following procedures on the assumption that all beams transmitted by the UE are not detected by a BS.

C-1) 'Method of Transmitting PRACH by Changing a Beam'

As 'Tx/Rx reciprocity' is not established for the UE, the UE may transmit PRACH on a new beam on the assumption that a previously transmitted beam (or PRACH transmitted on the beam) is not received by a BS. Thereafter, RAR reception corresponding to the transmitted PRACH and a subsequent operation may be the same as the aforementioned operation. In this case, transmission power of the PRACH may not increase at every reattempt moment of the UE.

Yet, if a UE is unable to transmit the same number of beams at every timing point of attempting PRACH transmission, the UE may reuse a beam used for a previous PRACH attempt as a prescribed beam for attempting PRACH transmission. Such an operation may apply to a case that a downlink best beam pair are changed between PRACH reattempt timing points, a case that an amount of pathloss estimated from the best beam pair is changed, or a case that the number of beams used for each PRACH attempt is not a divisor for the number of all beams.

C-2) 'Method of Increasing Transmission Power'

In case that a UE increases transmission power for PRACH retransmission, the number of beams transmittable by the UE at a time may be decreased (or configured to decrease). Here, a value of transmission power increased for RACH retransmission and a value of the simultaneously transmittable beams according to the transmission power value may be predefined by the standard technologies such as 3GPP standards and the like, configured cell-commonly by a BS, or configured through random access resource configuration information from a BS.

In the above description, a resource may apply to a sequence or frequency used for PRACH transmission. Namely, a resource in the present invention means a resource used to distinguish a PRACH signal at a specific timing point, which may correspond to a root sequence number, a cyclic shift, a frequency resource index and the like in the conventional LTE system.

(2) 'Method of Allowing a Multitude of PRACH Transmissions Time-Separated Before the RAR Window Interval End'

<1>'Method of Transmitting a Multitude of Time-Separated Beams on the Same Beam'

In case that a BS sweeps a PRACH Rx beam by specific periods, a UE can transmit a PRACH signal using the same beam. Yet, this is the scheme applicable to a case that 'Tx/Rx reciprocity' is not established in the BS only and may be inefficient in an environment in which a Tx beam of a synchronization signal block of the BS is associated with the PRACH Rx beam.

Here, the number of beams transmittable by the UE before the RAR window interval end may be restricted (or limited) according to a specific condition. Moreover, restrictions (or limitations) according to beam width, inter-beam angle difference and the like may be put on the same beam number.

The above restriction conditions may be predefined by the standard technologies such as 3GPP standards and the like, configured cell-commonly by a BS, or configured through random access resource configuration information from a BS.

<2>'Method of Transmitting a Multitude of Time-Separated PRACHs on Different Beams'

The above method may mean a method that a UE sweeps a PRACH Tx beam to work to a period of a PRACH Rx beam of a best beam pair obtained from a synchronization signal block.

Here, the number of beams transmittable by the UE before the RAR window interval end may be restricted (or limited) according to a specific condition. Moreover, restrictions (or limitations) according to beam width, inter-beam angle difference and the like may be put on the same beam number.

The above restriction conditions may be predefined by the standard technologies such as 3GPP standards and the like, configured cell-commonly by a BS, or configured through random access resource configuration information from a BS.

Based on the above-described items, the present invention proposes a method of flexibly applying a different random access operation between UEs. The above method may be used to effectively reduce a random access execution time of a 'Tx/Rx reciprocity' unestablished UE in general. Moreover, the above method may be applicable to a 'Tx/Rx reciprocity' established UE if necessary.

Besides, the configuration proposed by the present invention is non-limited by an initial random access procedure and can be applied to a random access procedure in response to a BS's request.

3.1. First Proposal

PRACH transmission using a multitude of Tx beams at a specific timing point may be allowed to a specific UE before an RAR detection attempt (or a single PRACH transmission attempt). Here, a multitude of the Tx beams may be FDMed using different frequency resources or CDMed using different sequences. In this case, information on the following conditions may be predefined by the standard technologies such as 3GPP standards and the like, configured cell-commonly by a BS, or delivered from a BS by being included in random access resource configuration information.

(1) Maximum number of simultaneously transmittable beams (2) Maximum value of a power sum of all simultaneously transmitted beams Here, a maximum power value may be given as a relative value (dB) such as a pathloss.

Here, a maximum value of a power sum may be set by being divided into several intervals. In this case, the maximum number of simultaneously transmittable beams may be set different per interval.

Here, the sum of power indicates a total sum of power used by each antenna panel.

(3) Maximum allowable transmission power of each simultaneously transmittable beam Here, a maximum allowable power value of each beam may be set by being divided into several intervals. Or, a maximum allowable power value of each beam may be set different according to the total number of simultaneously transmittable beams. In this case, a maximum allowable transmission power of each beam per interval may have a different value according to the total number of beams simultaneously transmittable per interval.

Here, a maximum allowable power value of each beam indicates a transmission power of an antenna panel used to form a corresponding beam. In this case, if another simultaneously transmitted beam exists, a maximum allowable power value of each beam may indicate a sum of all powers overlapping irrespective of an antenna panel. Or, if a side lobe of an overlapping beam is smaller than a specific value or fails to be separately indicated by the standard technology such as 3GPP standards or the like, a maximum allowable power value of each beam may indicate only a main-lobe maximum power of a beam formed in a specific direction.

(4) Maximum allowable value of an add-up value of beam widths of all simultaneously transmittable beams Here, a beam width indicates a range of angle having a power difference within 3 dB in comparison to maximum power of a main lobe.

Here, a maximum value of a power sum may be set by being divided into several intervals. In this case, the maximum number of simultaneously transmittable beams may be set different per interval.

Here, if beam widths of the respective beams overlap with each other, the overlapping portion is not considered in adding up beam widths of the entire beams. So to speak, if a specific beam and another beam overlap with each other, an overlapping beam width is not calculated in an overlapping manner in adding up the beam widths of the entire beams.

(5) Maximum beam width of each simultaneously transmittable beam

Here, a maximum beam width value of each beam may be set by being divided into several intervals and a maximum allowable beam width of each beam may be set different according to the total number of simultaneously transmittable beams. In this case, a maximum allowable beam width of each beam per interval may have a different value according to the total number of beams simultaneously transmittable per interval.

(6) Minimum angle difference of each simultaneously transmittable beam

Here, an angle of each beam indicates an angle having a maximum power within a main lobe.

Here, a minimum angle difference value of each beam may be set by being divided into several intervals and a minimum angle difference of each beam may be set different according to the total number of simultaneously transmittable beams.

The condition not configured by a standard technology such as 3GPP standard and the like or a BS or the condition not separately defined by default configuration among the aforementioned 6 conditions may not be considered by the random access procedure according to the present invention. So to speak, the condition not configured by a standard technology such as 3GPP standard and the like or a BS or the condition not separately defined by default configuration among the aforementioned 6 conditions may be ignored in the random access procedure according to the present invention.

Moreover, in case that a multitude of conditions among the aforementioned 6 conditions are configured simultaneously, a UE may transmit simultaneous PRACH transmission for a beam combination that meets all the corresponding conditions only.

Therefore, the maximum number of transmittable beams may differ between UEs transmitting PRACH signals by targeting the same base station or a specific Rx beam. And, in case of applying power ramping-up to a specific UE in a random access procedure, the maximum number of transmittable beams may decrease according to a time. Moreover, if a condition for a minimum requirement for Equivalent Isotropically Radiated Power (EIRP) and a text case are not defined in the standard technology such as 3GPP standards and the like, a condition for a beam width and a condition for a Tx beam power may be omitted.

3.2. Second Proposal

Before an RAR detection attempt (or a single PRACH transmission attempt), a specific UE may be allowed to perform a multitude of PRACH signal transmissions by TDM in a manner of dividing time. In this case, information on the following may be predefined by the standard technologies such as 3GPP standards and the like, configured cell-commonly by a BS, or delivered from a BS by being included in random access resource configuration information.

(1) Maximum repetition count of PRACH transmission allowed in case of a single RACH transmission attempt.

Here, the repeatedly transmitted PRACH transmission count may be set in a manner of being separated into a case of sweeping a PRACH Tx beam and a case of not sweeping a PRACH Tx beam. The above-described information may be predefined by the standard technologies such as 3GPP standards and the like, configured cell-commonly by a BS, or delivered from a BS by being included in random access resource configuration information.

Here, the repeatedly transmitted PRACH transmission count may be set in a manner of being divided into several intervals.

(2) Maximum allowable value of transmission power of each repeatedly transmitted PRACH signal Here, a maximum value may be given as a relative value (dB) such as a pathloss.

Here, a maximum value of a power sum may be set by being divided into several intervals. And, the maximum repeatedly transmittable PRACH transmission count may be set different per interval.

Here, transmission power of each PRACH signal may be defined as the whole output power of an antenna panel for forming a corresponding beam or an output power for a specific direction having a maximum power within a main lobe of the corresponding beam.

(3) Maximum beam width of each repeatedly transmitted beam

Here, a maximum beam width value of each beam may be set by being divided into several intervals and a maximum allowable beam width of each beam may be set different according to the total repeatedly transmittable PRACH count.

(4) Minimum angle difference of each repeatedly transmittable PRACH beam

Here, an angle of each beam indicates an angle having a maximum power within a main lobe.

Here, a minimum angle difference value of each beam may be set by being divided into several intervals and a minimum angle difference of each beam may be set different according to the total repeatedly transmittable PRACH count.

The condition not configured by a standard technology such as 3GPP standard and the like or a BS or the condition not separately defined by default configuration among the aforementioned 6 conditions may not be considered by the random access procedure according to the present invention. So to speak, the condition not configured by a standard technology such as 3GPP standard and the like or a BS or the condition not separately defined by default configuration among the aforementioned 6 conditions may be ignored in the random access procedure according to the present invention.

Moreover, in case that a multitude of conditions among the aforementioned 6 conditions are configured simultaneously, a UE may perform repetitive PRACH transmission for a beam combination that meets all the corresponding conditions only.

Therefore, the maximum number of transmittable beams may differ between UEs transmitting PRACH signals by targeting the same base station or a specific Rx beam. And, in case of applying power ramping-up to a specific UE in a random access procedure, the maximum repeatedly transmittable PRACH count may decrease according to a time.

3.3. Third Proposal

A BS and UE can classify a PRACH resource according to the aforementioned first proposal and/or the aforementioned second proposal. Here, a resource may mean a root sequence number, a cyclic shift, a frequency resource index, etc.

First of all, a PRACH resource set can be defined in a manner of being classified by the number of beams used for PRACH transmission according to the first proposal. Information on this may be predefined by the standard technologies such as 3GPP standards and the like, configured cell-commonly by a BS, or delivered from a BS by being included in random access resource configuration information.

In this case, a UE may select the number of simultaneously transmittable beams meeting at least one condition according to the first proposal, generate a PRACH signal within a PRACH resource set corresponding to the selected beam number, and then transmit the generated PRACH signal. If there is no special configuration for the PRACH resource set and there is no default configuration for the PRACH resource set as well, the UE can perform PRACH transmission using all PRACH resources.

Secondly, a PRACH resource set can be defined in a manner of being classified by the repeatedly transmittable PRACH number according to the second proposal. Information on this may be predefined by the standard technologies such as 3GPP standards and the like, configured cell-commonly by a BS, or delivered from a BS by being included in random access resource configuration information.

In this case, a UE may select the repeatedly transmittable PRACH count meeting at least one condition according to the second proposal, generate a PRACH signal within a PRACH resource set corresponding to the selected count, and then transmit the generated PRACH signal. If there is no special configuration for the PRACH resource set and there is no default configuration for the PRACH resource set as well, the UE can perform PRACH transmission using all PRACH resources.

Figure 17:
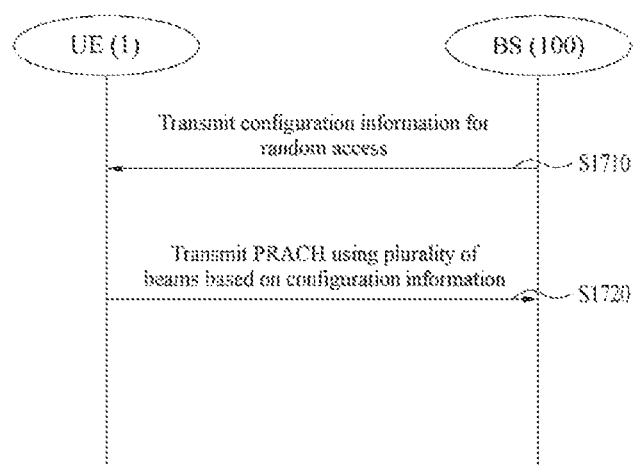
FIG. 17 is a diagram schematically showing a random access procedure between a UE and a base station.

FIG. 17 is a diagram schematically showing a random access procedure between a UE and a BS.

First of all, a BS transmits configuration information for a random access to a UE [S1710]. Here, the configuration information may include information indicating the maximum number A of simultaneously transmittable beams allowed for the UE or the maximum repetition count B allowed for the UE during a predetermined time. Namely, the configuration information may include information indicating A and/or B.

In response, the UE transmits PRACH using a plurality of beams based on the configuration information [S1720].

Particularly, the UE may transmit PRACH using different beams of which number is equal to or smaller than the maximum number of the beams simultaneously transmittable by the UE at a specific timing point or transmit PRACH by sweeping different beams of which number is equal to or smaller than the maximum repetition count allowed for the UE during the predetermined time.

For one example, if the UE transmits PRACH using different beams of which number is equal to or smaller than the maximum number of the simultaneously transmittable beams at a specific timing point based on the configuration information, the UE can use the same resource to transmit the PRACH using the different beams.

In doing so, if the UE receives a Random Access Response (RAR) signal from the BS, the UE can transmit a signal corresponding to the RAR signal using a specific beam among all the beams transmitted before the reception of the RAR signal.

For another example, if the UE transmits PRACH using different beams of which number is equal to or smaller than the maximum number of the simultaneously transmittable beams at a specific timing point based on the configuration information, the UE can use different resources to transmit the PRACH using the different beams.

Here, the different resources may include different frequency resources or resources based on different sequences.

In this case, if the UE receives only an RAR signal for one of a plurality of beams used to simultaneously transmit the PRACH, the UE may transmit a signal corresponding to the RAR signal using a beam corresponding to the received RAR signal.

Or, if the UE receives RAR signals for two or more of a plurality of beams used to simultaneously transmit the PRACH, the UE may determine whether the received RAR signals are RAR signals for the UE or another UE depending on whether a difference of Timing Advance (TA) information included in the received RAR signals for the two or more beams exceeds a predetermined threshold and then transmit a signal corresponding to one of the received RAR signals for the two or more beams based on the determination.

For another example, if the UE fails to receive Random Access Response (RAR) signal corresponding to all of a plurality of beams used to simultaneously transmit the PRACH, the UE may retransmit the PRACH using different beams, of which number is equal to or smaller than the maximum number of the beams simultaneously transmittable by the UE, other than a plurality of the beams.

In the above configuration, if the configuration information includes the information indicating the maximum number of beams simultaneously transmittable by the UE, the configuration information may include one of more of the following informations.

(A-1) Information on a maximum value of a power sum of all the simultaneously transmitted beams (A-2) Information on a maximum allowable transmission power of each beam simultaneously transmittable by the UE (A-3) Information on a maximum add-up value of beam widths of all beams simultaneously transmittable by the UE (A-4) Information on a maximum beam width of each beam simultaneously transmittable by the UE (A-5) Information on a minimum angle difference between beams simultaneously transmittable by the UE Or, if the configuration information includes information indicating a maximum repetition count allowed for the UE during the predetermined time, the configuration information may include one or more of the following informations.

(B-1) Information on a maximum allowable value for a transmission power of each PRACH signal repeatedly transmitted by the UE during the predetermined time (B-2) Information on a maximum beam width of each beam corresponding to each PRACH signal repeatedly transmitted by the UE during the predetermined time (B-3) Information on a minimum angle difference between beams corresponding to PRACH signals repeatedly transmitted by the UE during the predetermined time In response to the above-described operation of the UE, the BS can operate as follows.

First of all, the BS 100 transmits configuration information for a random access to the UE through a first transmission beam [S1710]. Here, the configuration information includes information indicating the maximum number of simultaneously transmittable beams allowed for the UE or a maximum repetition count allowed for the UE during a predetermined time. Subsequently, the BS 100 receives Physical Random Access Channel (PRACH) through a first reception beam corresponding to the first transmission beam from the UE operating on the basis of the configuration information [S1720].

As the examples of the above-described proposed method can be also included as one of implementations methods of the present invention, they can be obviously regarded as a sort of proposed methods. Although the examples of the above-described proposed methods can be implemented independently, they may be implemented in a combined (or merged) form of some of the proposed methods. Information on applicability of the proposed methods (or information on rules of the proposed methods) may be provided as notified to a UE by a BS through a predefined signal (e.g., a physical layer signal or a higher layer signal).

4. Device Configuration

Figure 18:
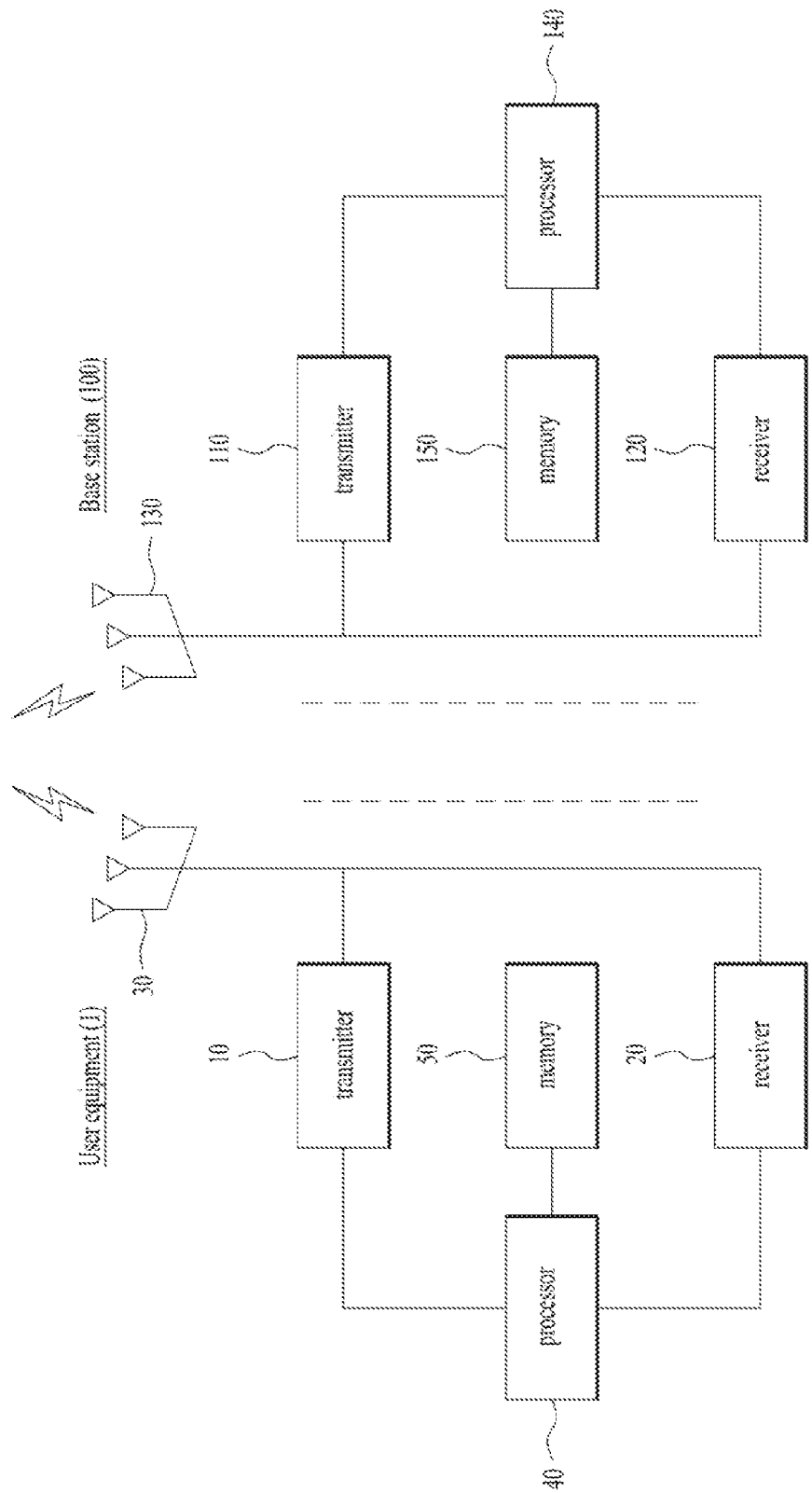
FIG. 18 is a diagram illustrating the configurations of a UE and a BS for implementing the proposed embodiments.

FIG. 18 is a diagram illustrating the configurations of a UE and a BS for implementing the proposed embodiments. The UE and the BS illustrated in FIG. 18 are implemented to perform the embodiments of the signal transmission and reception method between a BS and a UE.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

The above-configured UE 1 receives configuration information for a random access from the BS 100 through the receiver 20. Here, the configuration information may include information indicating the maximum number of simultaneously transmittable beams allowed for the UE or the maximum repetition count allowed for the UE during a predetermined time. Subsequently, based on the configuration information, the UE 1 may transmit Physical Random Access Channel (PRACH) using different beams of which number is equal to or smaller than the maximum number of the beams simultaneously transmittable by the UE at a specific timing point or transmit PRACH by sweeping different beams of which number is equal to or smaller than the maximum repetition count allowed for the UE during the predetermined time, through the transmitter 10.

In response, the BS 100 transmits configuration information for a random access to the UE through a first transmission beam through the transmitter 110. Here, the configuration information includes information indicating the maximum number of simultaneously transmittable beams allowed for the UE or a maximum repetition count allowed for the UE during a predetermined time. Subsequently, the BS 100 receives Physical Random Access Channel (PRACH) through a first reception beam corresponding to the first transmission beam from the UE operating on the basis of the configuration information through the receiver 120.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of performing a random access procedure with a base station by a user equipment in a wireless communication system, the method comprising:

receiving configuration information for a random access from the base station;

based on the configuration information including first information related to a maximum number of simultaneously transmittable beams allowed for the user equipment at a specific timing point and identification of the transmittable beams: simultaneously transmitting a Physical Random Access Channel (PRACH) using a plurality of beams with different beam directions of which number is equal to or smaller than the maximum number of the beams simultaneously transmittable by the user equipment at the specific timing point; and based on the configuration information including second information related to a maximum repetition count of a PRACH transmission over a single Random Access Channel (RACH) resource allowed for the user equipment during a predetermined time interval and identification of sweeping beams: transmitting the PRACH repeatedly by sweeping a plurality of beams of which number is equal to or smaller than the maximum repetition count allowed for the user equipment during the predetermined time interval, wherein based on the configuration information including the first information, the configuration information further includes information on a minimum angle difference between beams determined based on a number of beams simultaneously transmittable by the user equipment, and wherein based on the configuration information including the second information, the configuration information further includes information on the minimum angle difference between beams determined based on a number of PRACH signals repeatedly transmitted by the user equipment during the predetermined time interval.

2. The method of claim 1, wherein the user equipment uses a same resource to simultaneously transmit the PRACH using the plurality of beams with the different beam directions.

3. The method of claim 2, further comprising, based on receiving a Random Access Response (RAR) signal, transmitting a signal corresponding to the RAR signal using a specific beam among all beams transmitted before reception of the RAR signal.

4. The method of claim 1, wherein the user equipment uses a plurality of resources to simultaneously transmit the PRACH using the plurality of beams with the different beam directions of which number is equal to or smaller than the maximum number of the beams simultaneously transmittable by the user equipment at the specific timing point based on the configuration information.

5. The method of claim 4, wherein the plurality of resources comprise frequency resources different from each other.

6. The method of claim 4, wherein the plurality of resources comprise sequence resources different from each other.

7. The method of claim 4, further comprising, based on the user equipment receiving a Random Access Response (RAR) signal for only a single beam among a plurality of beams simultaneously used to transmit the PRACH, transmitting a signal corresponding to the RAR signal using a beam corresponding to the received RAR signal.

8. The method of claim 4, further comprising:
based on the user equipment receiving RAR signals for two or more of a plurality of beams simultaneously used to transmit the PRACH, determining whether the received RAR signals are RAR signals for the user equipment or another user equipment depending on whether a difference of Timing Advance (TA) information included in the received RAR signals for the two or more beams exceeds a predetermined threshold; and transmitting a signal corresponding to one of the received RAR signals for the two or more beams based on the determination.

9. The method of claim 1, further comprising, based on the user equipment failing to receive a Random Access Response (RAR) signal corresponding to all of a plurality of beams simultaneously used to transmit the PRACH, retransmitting the PRACH using a plurality of beams different from the plurality of beams simultaneously used to transmit the PRACH, wherein a number of the plurality of beams used for retransmitting the PRACH is equal to or smaller than the maximum number of the beams simultaneously transmittable by the user equipment at the specific timing point.

10. The method of claim 1, wherein based on the configuration information including the first information, the configuration information further includes at least one selected from the group consisting of:

information on a maximum value of a power sum of all the simultaneously transmitted beams, information on a maximum allowable transmission power of each beam simultaneously transmittable by the user equipment, information on a maximum add-up value of beam widths of all beams simultaneously transmittable by the user equipment, and information on a maximum beam width of each beam simultaneously transmittable by the user equipment.

11. The method of claim 1, wherein based on the configuration information including the second information, the configuration information further includes at least one selected from the group consisting of:

information on a maximum allowable value for a transmission power of each PRACH signal repeatedly transmitted by the user equipment during the predetermined time interval, and information on a maximum beam width of each beam corresponding to each PRACH signal repeatedly transmitted by the user equipment during the predetermined time interval.

12. A method of performing a random access procedure with a user equipment by a base station in a wireless communication system, the method comprising:

transmitting configuration information for a random access to the user equipment through a first transmission beam;

based on the configuration information including first information related to a maximum number of simultaneously transmittable beams allowed for the user equipment at a specific timing point and identification of the transmittable beams: simultaneously receiving a Physical Random Access Channel (PRACH) using a plurality of beams with different beam directions of which number is equal to or smaller than the maximum number of the beams simultaneously transmittable by the user equipment at the specific timing point; and based on the configuration information including second information related to a maximum repetition count of a PRACH transmission over a single Random Access Channel (RACH) resource allowed for the user equipment during a predetermined time interval and identification of sweeping beams: receiving the PRACH repeatedly by sweeping a plurality of beams of which number is equal to or smaller than the maximum repetition count allowed for the user equipment during the predetermined time interval, wherein based on the configuration information including the first information, the configuration information further includes information on a minimum angle difference between beams determined based on a number of beams simultaneously transmittable by the user equipment, and wherein based on the configuration information including the second information, the configuration information further includes information on the minimum angle difference between beams determined based on a number of PRACH signals repeatedly transmitted by the user equipment during the predetermined time interval.

13. A user equipment configured to perform a random access procedure with a base station in a wireless communication system, the user equipment comprising:
    a transmitting unit;
    a receiving unit; and
    a processor configured to operate by being connected to the transmitting unit and the receiving unit,
    wherein the processor is further configured to:
    receive configuration information for a random access from the base station;
    based on the configuration information including first information related to a maximum number of simultaneously transmittable beams allowed for the user equipment at a specific timing point and identification of the transmittable beams: simultaneously transmit a Physical Random Access Channel (PRACH) using a plurality of beams with different beam directions of which number is equal to or smaller than the maximum number of the beams simultaneously transmittable by the user equipment at the specific timing point; and
    based on the configuration information including second information related to a maximum repetition count of a PRACH transmission over a single Random Access Channel (RACH) resource allowed for the user equipment during a predetermined time interval and identification of sweeping beams: transmit the PRACH repeatedly by sweeping a plurality of beams of which number is equal to or smaller than the maximum repetition count allowed for the user equipment during the predetermined time interval,
    wherein based on the configuration information including the first information, the configuration information further includes information on a minimum angle difference between beams determined based on a number of beams simultaneously transmittable by the user equipment, and
    wherein based on the configuration information including the second information, the configuration information further includes information on the minimum angle difference between beams determined based on a number of PRACH signals repeatedly transmitted by the user equipment during the predetermined time interval.

14. The user equipment of claim 13, wherein the user equipment is configured to communicate with at least one of another user equipment, a user equipment related to an autonomous driving vehicle, the base station or a network.

15. A base station configured to perform a random access procedure with a user equipment in a wireless communication system, the base station comprising:
    a transmitting unit;
    a receiving unit; and
    a processor configured to operate by being connected to the transmitting unit and the receiving unit,
    wherein the processor is further configured to:
    transmit configuration information for a random access to the user equipment through a first transmission beam;
    based on the configuration information including first information related to a maximum number of simultaneously transmittable beams allowed for the user equipment at a specific timing point and identification of the transmittable beams: simultaneously receiving a Physical Random Access Channel (PRACH) using a plurality of beams with different beam directions of which number is equal to or smaller than the maximum number of the beams simultaneously transmittable by the user equipment at the specific timing point; and
    based on the configuration information including second information related to a maximum repetition count of a PRACH transmission over a single Random Access Channel (RACH) resource allowed for the user equipment during a predetermined time interval and identification of sweeping beams: receiving the PRACH repeatedly by sweeping a plurality of beams of which number is equal to or smaller than the maximum repetition count allowed for the user equipment during the predetermined time interval,
    wherein based on the configuration information including the first information, the configuration information further includes information on a minimum angle difference between beams determined based on a number of beams simultaneously transmittable by the user equipment, and
    wherein based on the configuration information including the second information, the configuration information further includes information on the minimum angle difference between beams determined based on a number of PRACH signals repeatedly transmitted by the user equipment during the predetermined time interval.

* * * * *